US010439790B2

United States Patent
Yoo et al.

(10) Patent No.: US 10,439,790 B2
(45) Date of Patent: Oct. 8, 2019

(54) COMMUNICATION APPARATUS AND METHOD FOR UNMANNED AERIAL VEHICLE

(71) Applicant: Korea Aerospace Research Institute, Daejeon (KR)

(72) Inventors: Chang Sun Yoo, Daejeon (KR); Joong Wook Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

(21) Appl. No.: 15/767,147

(22) PCT Filed: Oct. 12, 2016

(86) PCT No.: PCT/KR2016/011403
§ 371 (c)(1),
(2) Date: Apr. 10, 2018

(87) PCT Pub. No.: WO2017/065485
PCT Pub. Date: Apr. 20, 2017

(65) Prior Publication Data
US 2019/0074956 A1  Mar. 7, 2019

(30) Foreign Application Priority Data
Oct. 13, 2015  (KR) .................. 10-2015-0142834

(51) Int. Cl.
*H04L 5/14*  (2006.01)
*H04B 7/185*  (2006.01)
(Continued)

(52) U.S. Cl.
CPC .......... *H04L 5/1423* (2013.01); *B64C 39/024* (2013.01); *H01Q 1/28* (2013.01);
(Continued)

(58) Field of Classification Search
None
See application file for complete search history.

(56) References Cited

U.S. PATENT DOCUMENTS 7,408,898 B1    8/2008  Brown
7,751,823 B2 *  7/2010  Karabinis .......... H04B 7/18513
                                                  455/450
(Continued)

FOREIGN PATENT DOCUMENTS

KR  10-2011-0088053  8/2011
KR  10-2012-0006160  1/2012
(Continued)

OTHER PUBLICATIONS

Jennifer L. Richter, "Comments of the Small UAV Coalition Before the Federal Communications Commission", Aug. 31, 2015, p. 8, Paragraph A. (Year: 2015).*
(Continued)

*Primary Examiner* — Dale W Hilgendorf
*Assistant Examiner* — Alexander Connor Larkin Bost

(57) ABSTRACT

A communication system for an unmanned aerial vehicle according to one embodiment of the present invention comprises: an onboard communication apparatus, mounted on an unmanned aerial vehicle, for communicating by means of a previously configured frequency band; and a ground communication apparatus for communicating with the onboard communication apparatus by means of the previously configured frequency band.

13 Claims, 2 Drawing Sheets

(51) Int. Cl.
  *H04B 7/208* (2006.01)
  *B64C 39/02* (2006.01)
  *H01Q 1/28* (2006.01)

(52) U.S. Cl.
  CPC ......... *H04B 7/185* (2013.01); *H04B 7/18504* (2013.01); *H04B 7/18506* (2013.01); *H04B 7/18508* (2013.01); *H04B 7/208* (2013.01)

(56) References Cited

U.S. PATENT DOCUMENTS

| | | | |
|---|---|---|---|
| 2007/0243505 A1 | 10/2007 | Rath et al. | |
| 2010/0004802 A1* | 1/2010 | Bodin | G05D 1/0038 701/11 |
| 2010/0087980 A1 | 4/2010 | Spura | |

FOREIGN PATENT DOCUMENTS

| | | |
|---|---|---|
| KR | 10-2015-0021293 | 3/2015 |
| WO | WO 2017/065485 | 4/2017 |

OTHER PUBLICATIONS

Song et al., machine translation of KR 1020150021293, Mar. 10, 2015, Korean Intellectual Patent Office (Year: 2015).*

International Search Report and the Written Opinion dated Jan. 17, 2017 From the Korean Intellectual Property Office Re. Application No. PCT/KR2016/011403 and Its Translation of the Search Report Into English. (12 Pages).

Supplementary European Search Report and the European Search Opinion dated May 8, 2019 From the European Patent Office Re. Application No. 16855702.3. (11 Pages).

Martinez Paredes et al. "Challenges in Designing Communication Systems for Unmanned Aerial Systems Integration Into Non-Segregated Airspace", 2014 IEEE Military Communications Conference, MILCOM 2014, Baltimore, MD, USA, Oct. 6-8, 2014, XP032686529, p. 1435-1439, Oct. 6, 2014.

* cited by examiner

COMMUNICATION APPARATUS AND METHOD FOR UNMANNED AERIAL VEHICLE

RELATED APPLICATIONS

This application is a National Phase of PCT Patent Application No. PCT/KR2016/011403 having International filing date of Oct. 12, 2016, which claims the benefit of priority of Korean Patent Application No. 10-2015-0142834 filed on Oct. 13, 2015. The contents of the above applications are all incorporated by reference as if fully set forth herein in their entirety.

FIELD AND BACKGROUND OF THE INVENTION

The present invention relates to a communication apparatus and method, and more particularly, to a communication apparatus and method for an unmanned aerial vehicle.

An unmanned aerial vehicle (UAV) is an aircraft that does not carry a pilot, can be remotely controlled from the ground, fly according to a pre-programed program, or autonomously fly by recognizing and determining a surrounding environment by itself.

Although UAVs are mostly used in the military, civilian UAVs are increasingly being used. Accordingly, safety issues of UAVs are on the rise.

In order to maintain safety of an unmanned aircraft system, a communication link between an aircraft (i.e., an UAV) and a ground control system (GCS) needs to be stably maintained. A communication apparatus is more important in unmanned aircraft systems than in manned aircraft systems. Also, since an UAV does not have a pilot aboard, it is dependent upon a communication system more than a manned aerial vehicle in controlling an aerial vehicle, and has a need for a more independent and secure communication.

SUMMARY OF THE INVENTION

The present invention is directed to providing a communication apparatus and method for ensuring safe operation of an unmanned aerial vehicle.

One aspect of the present invention provides a communication system for an unmanned aerial vehicle (UAV) including: an onboard communication apparatus mounted on an UAV and configured to operate using a preset frequency band; and a ground communication apparatus configured to communicate with the onboard communication apparatus using the preset frequency band.

The preset frequency band may be a C-band.

The preset frequency band may be a band of 5,030 MHz to 5,091 MHz.

At least one of a telecommands (TCs) and telemetry (TM) may be transmitted and received between the onboard communication apparatus and the ground communication apparatus.

The ground communication apparatus may communicate with a ground control apparatus through Ethernet, and the onboard communication apparatus communicates with a flight control computer mounted on the UAV through RS-232.

The ground communication apparatus may include a baseband unit connected to the ground control apparatus, a transmission unit connected to the baseband unit, a reception unit connected to the baseband unit, a duplexer connected to the transmission unit and the reception unit, and an antenna unit connected to the duplexer; and the onboard communication apparatus may include a baseband unit connected to the flight control computer, a transmission unit connected to the baseband unit, a reception unit connected to the baseband unit, a duplexer connected to the transmission unit and the reception unit, and an antenna unit connected to the duplexer.

The onboard communication apparatus may further include a divider interposed between and connected to the duplexer and the antenna unit, and the antenna unit includes a first antenna unit and a second antenna unit mounted on different positions.

The onboard communication apparatus and the ground communication apparatus may emit radio waves with a power of −75 dBW/MHz at an outside of the preset frequency band.

Another aspect of the present invention provides a communication method applied in a communication system for an UAV, the communication method including: receiving, by an onboard communication apparatus mounted on an UAV, a signal for controlling the UAV from a ground communication apparatus using a preset frequency band; and processing, by the onboard communication apparatus, the signal.

Another aspect of the present invention provides a communication method applied in a communication system for an UAV, the communication method including: generating, by a ground communication apparatus, a signal for controlling an UAV; and transmitting, by the ground communication apparatus, the signal to an onboard communication apparatus mounted on the UAV using a preset frequency band.

According to embodiments of the present invention, a communication link between an unmanned aerial vehicle and a ground control system can be stably maintained, thus enabling safe operation of the unmanned aerial vehicle.

DESCRIPTION OF SPECIFIC EMBODIMENTS OF THE INVENTION

Figure 1:
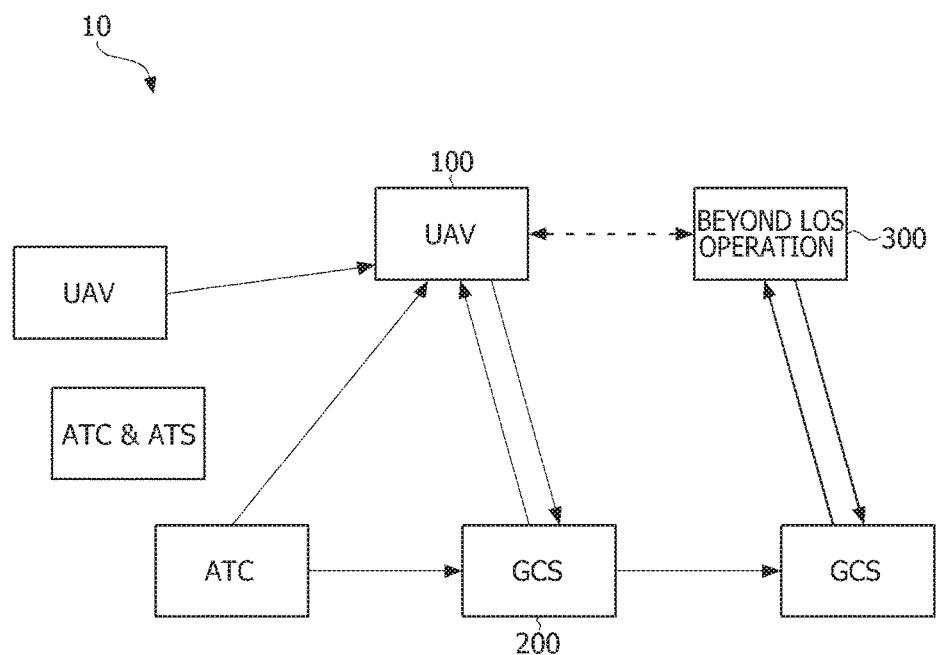
FIG. 1 is a view illustrating an unmanned aircraft system according to one embodiment of the present invention.

While the present invention is susceptible to various modifications and alternative embodiments, specific embodiments thereof are exemplarily shown in the drawings and will be described. However, it should be understood that there is no intention to limit the present invention to the particular embodiments disclosed, and, on the contrary, the present invention is to cover all modifications, equivalents, and alternatives falling within the spirit and scope of the present invention.

Although the terms including ordinal numbers, such as "first," "second," and the like may be used to describe various components, the terms do not limit the corresponding components and are used only for the purpose of distinguishing one component from another component. For example, without departing from the range of the scope of the present invention, a first component may be referred to as a second component, and similarly a second component may be referred to as a first component. The term "and/or" refers to a combination of a plurality of described related items or any one of the plurality of described related items.

It should be understood that when an element is referred to as being "connected" or "coupled" to another element, the element may be directly or indirectly connected or coupled to the other element, or intervening elements may be present. Conversely, when an element is referred to as being "directly connected to" or "directly coupled to" another element, there are no intervening elements present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments of the present invention will be described in detail with reference to the accompanying drawings. The same reference numerals will be used to designate the same elements, and details of redundant descriptions will be omitted throughout the entire specification.

FIG. 1 is a view illustrating an unmanned aircraft system according to one embodiment of the present invention.

Referring to FIG. 1, an unmanned aircraft system 10 includes an unmanned aerial vehicle (UAV) 100 and a ground control system (GCS) 200.

The UAV 100 and the GCS 200 communicate with each other in a wireless manner. In this case, communication between the UAV 100 and the GCS 200 may be divided into a line of sight (LOS) operation and a beyond LOS operation. The LOS operation is a communication method employed when the UAV 100 and the GCS 200 are directly connected to each other, and the beyond LOS operation is a communication method in which the UAV 100 and the GCS 200 are connected using a satellite 300 and the like when an obstacle exists therebetween.

At least one of telecommands (TCs) and telemetry (TM) may be transmitted and received between the UAV 100 and the GCS 200. Here, the TC represents a transmission signal for controlling a remote system, and the TM represents a technology for measuring information at remote points using radio waves or an IP network.

Meanwhile, a communication between the UAV 100 and the GCS 200 may be divided into an uplink communication and a downlink communication. A command and a control signal for taking off or lifting the UAV 100 or moving the UAV 100 to a flight region to perform a task may be transmitted from the GCS 200 to the UAV 100 through the uplink communication. Various pieces of sensor data, such as a location and posture of the UAV 100, may be transmitted from the UAV 100 to the GCS 200 through the downlink communication.

As such, in order for the UAV 100 and the GCS 200 to communicate with each other, a predetermined frequency band needs to be used. According to the embodiment of the present invention, the UAV 100 and the GCS 200 communicate with each other in a preset frequency band. Accordingly, frequency bands for communication between civilian UAVs, of which demand is rapidly increasing, and the GCS may be predetermined, and thus frequency collision may be avoided such that secure communication may be achieved.

Figure 2:
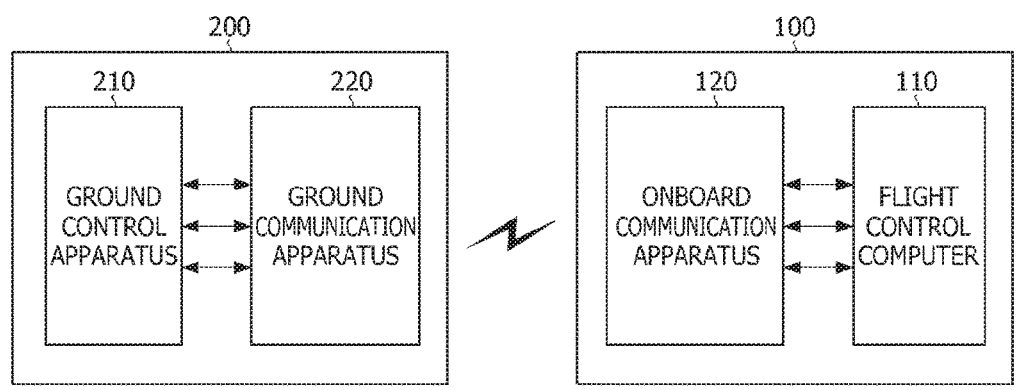
FIG. 2 is a block diagram illustrating an unmanned aerial vehicle (UAV) and a ground control system (GCS) according to one embodiment of the present invention.

FIG. 2 is a block diagram illustrating an UAV and a GCS according to one embodiment of the present invention.

Referring to FIG. 2, an UAV 100 includes a flight control computer (FCC) 110 and an onboard communication apparatus 120. Although not shown in FIG. 2, the UAV 100 may further include an electronic control unit (ECU) that operates task equipment according to a command from the FCC 110 and a camera.

The FCC 110 receives an uplink signal provided from the GCS 200 through the onboard communication apparatus 120, and accordingly, controls flight of the UAV 100 and performs a preset task.

Here, the uplink signal may be command information that is required for operation of the UAV 100. The command information, for example, may include command information related to flight control and navigation and command information related to operation of task equipment. Here, the flight control and navigation command may include commands for controlling a posture control mode, an altitude/speed/heading hold mode, and an autopilot mode. The autopilot mode may include a way point navigation mode, a pre-programmed mode, an auto take-off/landing and hovering mode, a recovery mode, a collision avoidance mode, a camera guide mode, and an emergency mode. The command information related to the operation of task equipment may include manipulation commands of a camera mounted on the task equipment, such as a rotation command, a reduction and enlargement command, an optical/thermal imaging shift command, and the like.

In addition, the FCC 110 may transmit a downlink signal to the GCS 200 through the onboard communication apparatus 120. The downlink signal may include aircraft state information collected from the camera, the task equipment, various sensors, and the like mounted on the UAV 100. The aircraft state information, for example, may include aircraft posture and navigation information, analog sensor information, and results of checking various units of the onboard equipment. Here, the navigation information may include information related to a speed, an altitude, a heading, a position, and the like, and the analog sensor information may include information related to a temperature, a pressure, a vibration, and the like.

The onboard communication apparatus 120 receives an uplink signal transmitted from the GCS 200 and delivers the received uplink signal to the FCC 110. The onboard communication apparatus 120 collects and generates a downlink signal and transmits the collected and generated downlink signal to the GCS 200.

To this end, the onboard communication apparatus 120 may communicate with the FCC 110 using three types of interfaces. For example, the onboard communication apparatus 120 may transmit and receive TC data and TM data through a data interface, receive an image captured by the camera through an image signal interface in an analog scheme, and transmit and receive a voice signal through a voice signal interface.

The GCS 200 includes a ground control apparatus 210 and a ground communication apparatus 220.

The ground control apparatus 210 receives a downlink signal through communication between the onboard communication apparatus 120 and the ground communication apparatus 220. The downlink signal may include the aircraft state information collected by the UAV 100, and the aircraft state information may include the aircraft posture and navigation information, the analog sensor information, and the results of checking various units of the onboard equipment.

The ground control apparatus 210 transmits an uplink signal to the UAV 100 through the ground communication apparatus 220. Here, the uplink signal may include the flight control data and task equipment control data.

The ground communication apparatus 220 collects and generates an uplink signal to be transmitted to the UAV 100 and transmits the collected and generated uplink signal to the UAV 100. The ground communication apparatus 220 receives a downlink signal transmitted from the UAV 100 and delivers the received downlink signal to the ground control apparatus 210.

To this end, the ground communication apparatus 220 may communicate with the ground control apparatus 210 using three types of interfaces. For example, the ground communication apparatus 220 may transmit and receive TC data and TM data through a data interface, receive an image captured by the camera through an image signal interface in an analog scheme, and transmit and receive a voice signal through a voice signal interface.

In this specification, the onboard communication apparatus 120 and the ground communication apparatus 220 may be collectively referred to as a communication system for an UAV.

According to one embodiment of the present invention, the onboard communication apparatus 120 and the ground communication apparatus 220 may communicate with each other in a preset frequency band. In more detail, a downlink signal from the onboard communication apparatus 120 to the ground communication apparatus 220 may be transmitted in a band of 5,100 MHz to 5,150 MHz, and an uplink signal from the ground communication apparatus 220 to the onboard communication apparatus 120 may be transmitted in a C-band, that is, a band 5,030 MHz to 5,091 MHz. In this case, the frequencies of 5,030 MHz to 5,091 MHz may be non-payload frequencies. As such, when the UAV is controlled in the band of 5,030 MHz to 5,091 MHz, secure communication between the onboard communication apparatus 120 and the ground communication apparatus 220 is ensured. In this case, the ground communication apparatus 220 may emit radio waves with a power of −75 dBW/MHz at an outside of the band of 5,030 MHz to 5,091 MHz. Accordingly, collision with a radio navigation satellite in a frequency band adjacent to the frequency band used by the ground communication apparatus 220 may be prevented.

Figure 3:
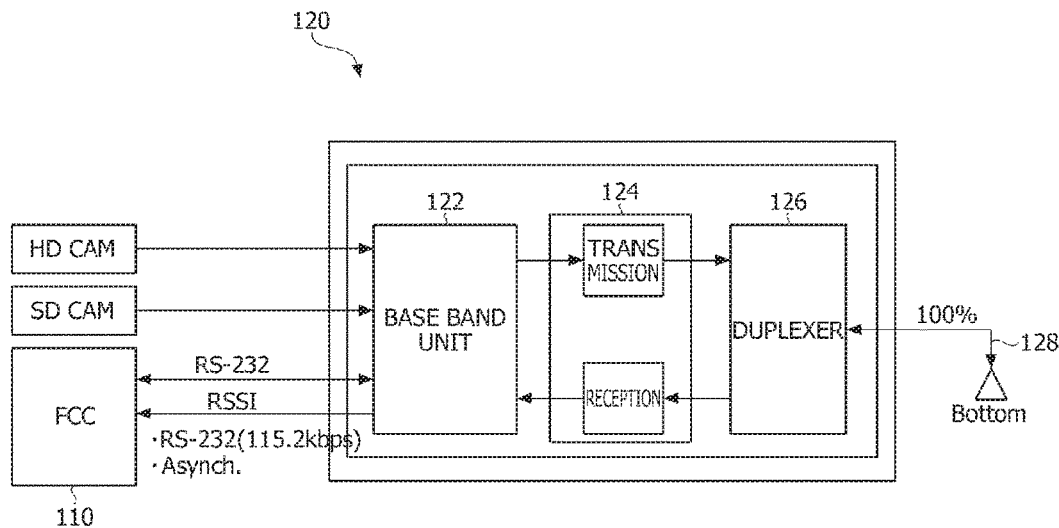
FIG. 3 is a block diagram illustrating an onboard communication apparatus mounted in the UAV according to one embodiment of the present invention.
Figure 4:
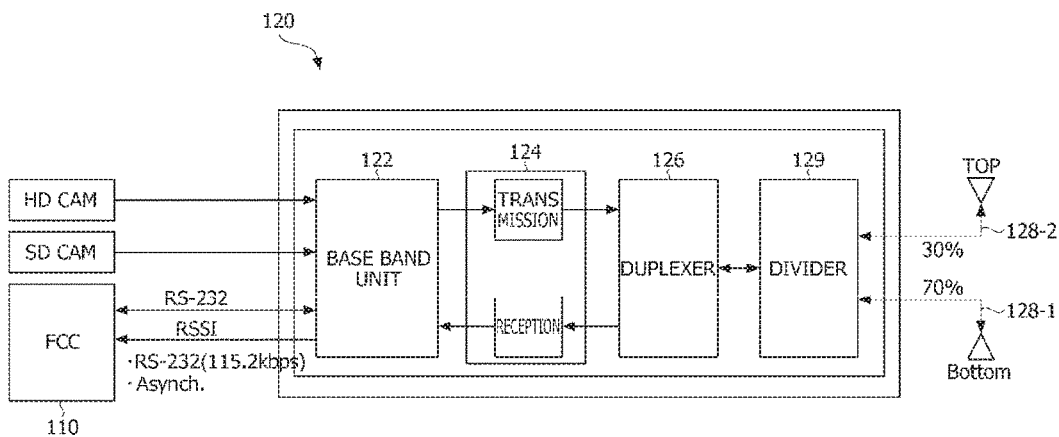
FIG. 4 is a block diagram illustrating an onboard communication apparatus mounted in the UAV according to another embodiment of the present invention.
Figure 5:
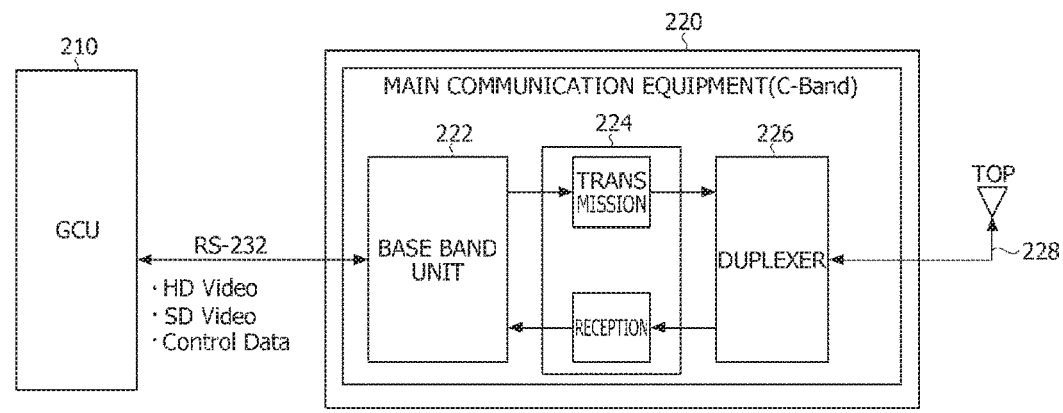
FIG. 5 is a block diagram illustrating a ground communication apparatus included in the GCS according to one embodiment of the present invention.

FIG. 3 is a block diagram illustrating an onboard communication apparatus mounted in the UAV according to one embodiment of the present invention, FIG. 4 is a block diagram illustrating an onboard communication apparatus mounted in the UAV according to another embodiment of the present invention, and FIG. 5 is a block diagram illustrating a ground communication apparatus included in the GCS according to one embodiment of the present invention.

Referring to FIG. 3, the onboard communication apparatus 120 may communicate with the FCC 110 using a RS-232 serial communication interface, and may include a baseband unit 122 connected to the FCC 110 and configured to receive data from a high definition (HD) camera (CAM) and a standard definition (SD) CAM, a transceiver unit 124 connected to the baseband unit 122, a duplexer 126 connected to the transceiver unit 124, and an antenna unit 128 connected to the duplexer 126. The transceiver unit 124 may include a transmission unit and a reception unit.

Referring to FIG. 4, the onboard communication apparatus 120 may further include a divider 129 between the duplexer 126 and the antenna unit 128. The antenna unit 128 may include a first antenna unit 128-1 and a second antenna unit 128-2. The first antenna unit 128-1 may be mounted on the bottom of the UAV, and the second antenna unit 128-2 may be mounted on the top of the UAV. The first antenna unit mounted on the bottom of the UAV is normally operated. However, a case in which an LOS of the antenna is not obtained exists depending on the state of the UAV. In this case, the second antenna unit mounted on the top of the UAV is operated so that communication loss may be prevented. To this end, the divider 129 may divide frequencies or times and transmit the divided frequencies or times through the first antenna unit 128-1 and the second antenna unit 128-2. In particular, an alignment between antennas is important in the C-band which is a high frequency band. Due to the first antenna unit and the second antenna unit being mounted on different positions according to the embodiment of the present invention, alignment with an antenna unit 228 of the ground communication apparatus 220 is facilitated, and thus, a transmission speed may be improved and a transmission amount may be increased.

Although the onboard communication apparatus 120 is exemplarily illustrated as including two antenna units, that is, the first antenna unit 128-1 and the second antenna unit 128-2 in this specification, the present invention is not limited thereto. For example, a plurality of antenna units may be provided to be mounted at each of the bottom and the top of an UAV.

Referring to FIG. 5, the ground communication apparatus 220 may communicate with the ground control apparatus 210 through Ethernet, and may include a baseband unit 222 connected to the ground control apparatus 210, a transceiver unit 224 connected to the baseband unit 222, a duplexer 226 connected to the transceiver unit 224, and an antenna unit 228 connected to the duplexer 226. The transceiver unit 224 may include a transmission unit and a reception unit. In this case, the antenna unit 228 may be a directional antenna that is directed toward the UAV.

Although exemplary embodiments of the present invention have been described for illustrative purposes, those skilled in the art should appreciate that various modifications, additions, and substitutions are possible without departing from the scope and spirit of the present invention.

What is claimed is:

1. A communication system for an unmanned aerial vehicle, the communication system comprising:
   an onboard communication apparatus mounted on an unmanned aerial vehicle and configured to operate using a preset frequency band; and a ground communication apparatus configured to communicate with the onboard communication apparatus using the preset frequency band, wherein the ground communication apparatus includes a baseband unit connected to a ground control apparatus, a transmission unit connected to the baseband unit, a reception unit connected to the baseband unit, a duplexer connected to the transmission unit and the reception unit, and an antenna unit connected to the duplexer, and wherein the onboard communication apparatus includes a baseband unit connected to a flight control computer, a transmission unit connected to the baseband unit, a reception unit connected to the baseband unit, a duplexer connected to the transmission unit and the reception unit, and an antenna unit connected to the duplexer.

2. The communication system of claim 1, wherein the preset frequency band is a C-band.

3. The communication system of claim 2, wherein the preset frequency band is a band of 5,030 MHz to 5,091 MHz.

4. The communication system of claim 1, wherein at least one of telecommands (TCs) and telemetry (TM) is transmitted and received between the onboard communication apparatus and the ground communication apparatus.

5. The communication system of claim 1, wherein the ground communication apparatus communicates with the ground control apparatus through Ethernet, and the onboard communication apparatus communicates with the flight control computer mounted on the unmanned aerial vehicle through RS-232.

6. The communication system of claim 1, wherein the onboard communication apparatus further includes a divider interposed between and connected to the duplexer and the antenna unit, and the antenna unit includes a first antenna unit and a second antenna unit mounted on different positions.

7. The communication system of claim 1, wherein the onboard communication apparatus and the ground communication apparatus emit radio waves with a power of −75 dBW/MHz at an outside of the preset frequency band.

8. A communication method applied in a communication system for an unmanned aerial vehicle, the communication method comprising:

receiving, by an onboard communication apparatus mounted on an unmanned aerial vehicle, a signal for controlling the unmanned aerial vehicle from a ground communication apparatus using a preset frequency band; and processing, by the onboard communication apparatus, the signal, wherein the ground communication apparatus includes a baseband unit connected to a ground control apparatus, a transmission unit connected to the baseband unit, a reception unit connected to the baseband unit, a duplexer connected to the transmission unit and the reception unit, and an antenna unit connected to the duplexer, and wherein the onboard communication apparatus includes a baseband unit connected to a flight control computer, a transmission unit connected to the baseband unit, a reception unit connected to the baseband unit, a duplexer connected to the transmission unit and the reception unit, and an antenna unit connected to the duplexer.

9. The communication method of claim 8, wherein the preset frequency band is a C-band.

10. The communication method of claim 9, wherein the preset frequency band is a band of 5,030 MHz to 5,091 MHz.

11. A communication method applied in a communication system for an unmanned aerial vehicle, the communication method comprising:

generating, by a ground communication apparatus, a signal for controlling an unmanned aerial vehicle; and transmitting, by the ground communication apparatus, the signal to an onboard communication apparatus mounted on the unmanned aerial vehicle using a preset frequency band, wherein the ground communication apparatus includes a baseband unit connected to a ground control apparatus, a transmission unit connected to the baseband unit, a reception unit connected to the baseband unit, a duplexer connected to the transmission unit and the reception unit, and an antenna unit connected to the duplexer, and wherein the onboard communication apparatus includes a baseband unit connected to a flight control computer, a transmission unit connected to the baseband unit, a reception unit connected to the baseband unit, a duplexer connected to the transmission unit and the reception unit, and an antenna unit connected to the duplexer.

12. The communication method of claim 11, wherein the preset frequency band is a C-band.

13. The communication method of claim 12, wherein the preset frequency band is a band of 5,030 MHz to 5,091 MHz.

* * * * *